United States Patent [19]

Osanai

[11] Patent Number: 4,736,301

[45] Date of Patent: Apr. 5, 1988

[54] CONTROL DEVICE AND METHOD IN CONTINUOUSLY VARIABLE TRANSMISSION SYSTEM FOR VEHICLE

[75] Inventor: Akinori Osanai, Susono, Japan

[73] Assignee: Toyota Jidosha Kabushiki Kaisha, Toyota, Japan

[21] Appl. No.: 739,279

[22] Filed: May 30, 1985

[30] Foreign Application Priority Data

Jun. 1, 1984 [JP] Japan ................. 59-110929

[51] Int. Cl.$^4$ ................. B60K 41/12; F16H 11/06
[52] U.S. Cl. ................. 364/424.1; 74/865; 74/866; 474/12; 474/18
[58] Field of Search ................. 364/424.1; 74/866; 474/11, 12, 16, 18, 28

[56] References Cited

U.S. PATENT DOCUMENTS

| | | | |
|---|---|---|---|
| 4,466,521 | 8/1984 | Hattori et al. | 74/866 |
| 4,470,117 | 9/1984 | Miki et al. | 364/424.1 |
| 4,546,673 | 10/1985 | Shigematsu et al. | 74/866 |
| 4,584,907 | 4/1986 | Niwa et al. | 74/866 |
| 4,601,680 | 7/1986 | Tokoro et al. | 474/11 |
| 4,642,068 | 2/1987 | Osanai et al. | 474/11 |

Primary Examiner—Felix D. Gruber
Attorney, Agent, or Firm—Oblon, Fisher, Spivak, McClelland & Maier

[57] ABSTRACT

In a control device in continuously variable transmission system for a vehicle, wherein a belt is racked across a pulley on the input side and a pulley on the output side, an engine power is transmitted through this belt, and an urging force of the belt by one of the pulleys is controlled by a line pressure of a hydraulic cylinder of the pulley, an engine output torque is determined from an engine rotational speed, an intake throttle opening or an intake air flowrate per unit rotation of the engine and engine operation parameters other than said data, and the line pressure is regulated in relation to the so determined value to obtain the proper line pressure as accurately commensurate to the actual output torque of the engine, so that the fuel consumption rate can be lowered to the maximum, avoiding the slips of the belt.

9 Claims, 11 Drawing Sheets

CONTROL DEVICE AND METHOD IN CONTINUOUSLY VARIABLE TRANSMISSION SYSTEM FOR VEHICLE

BACKGROUND OF THE INVENTION

1. Field of the Invention

This invention relates to a control device and method in a continuously variable transmission system (hereinafter referred to briefly as "CVT") used as a power transmission system in a vehicle, and more particularly to a line pressure control system in the CVT.

2. Description of the Prior Art

In a CVT, an engine power is transmitted by means of a belt racked across a pulley on the input side and a pulley on the output side, and an urging force of the belt by one of the pulleys, normally the pulley on the output side, is controlled by a line pressure of a hydraulic cylinder of the pulley on the output side. If this urging force is small in value, then the belt tends to slip on the pulleys, whereby a torque cannot be transmitted, and, if this urging force is high in value, then heat loss due to the extension or shrinkage of the belt and driving loss of an oil pump are increased, whereby the fuel consumption is increased. In consequecne, it is desired that the line pressure is properly controlled as commensurate to an output torque of an engine or a transmitted torque, however, according to the conventional techniques, the output torque of the engine, which constitutes the base of calculation of the line pressure has been calculated only from an engine rotational speed and an intake throttle opening (Refer to Japanese Utility Model Laid-Open No. 203259/1983 for example). However, the output torque of the engine is variable due to other operation parameters of the engine such as an air-fuel ratio of a gasified fuel-air mixture, and consequently, the fact is that the line pressure is not controlled to a satisfactorily proper value.

SUMMARY OF THE INVENTION

The present invention has as its object the provision of a control device and method in a CVT, capable of controlling such that a line pressure can be at a proper value commensurate to an actual output of an engine.

To this end, the present invention contemplates that, in a control device in a CVT for a vehicle, wherein a belt is racked across a pulley on the input side and a pulley on the output side, an engine power is transmitted through the belt, and an urging force of the belt by one of the pulleys is controlled by a line pressure of a hydraulic cylinder of this pulley, the aforesaid control device includes:

means for determining an output torque of an engine from an engine rotational speed, an intake throttle opening or an intake air flowrate per unit rotation of the engine and engine operation parameters other than the above data; and means for regulating the line pressure in relation to a value calculated by the calculating means.

According to the present invention, the engine output torque is calculated in consideration of not only the engine rotational speed and the intake throttle opening (or the intake air flowrate per unit rotation of the engine) but also other operation parameters giving influences to the engine output torque, so that the line pressure regulated in relation to the above-described values thus calculated can be a proper value accurately commensurate to the actual output torque of the engine. As the result, the fuel consumption rate can be decreased to the maximum, avoiding the slips of the belt.

In the preferred embodiment, the operation parameters other than the engine rotational speed and the intake throttle opening (or the intake air flowrate per unit rotation of the engine) include temperature of the engine, an air-fuel ratio of a gasified fuel-air mixture, the number of cylinders, to which fuel is supplied, out of all of cylinders or the presence of exhaust gas recirculation.

Preferably, one of pulleys as described above is a pulley on the output side and the feed to and the discharge from the hydraulic cylinder of a pulley on the input side are concerned with the control of a speed ratio e of the CVT.

Further preferably, a map is provided for each condition of the operation parameters and the determining means determines an engine output torque on the basis of each of said maps. Or the determining means calculates the engine output torque on the basis of a product obtained by multiplying coefficients determined in accordance with the conditions of the aforesaid operation parameters and a basic output torque determined from a reference map.

Still further preferably, the aforesaid regulating means calculates a target line pressure on the basis of a product obtained by multiplying the engine output torque, an inverse number of the speed ratio e of the CVT and the coefficients, and outputs a control signal to a pressure regulator valve on the basis of the value thus calculated.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Description will hereunder be given of embodiments of the present invention with reference to the drawings.

Figure 1:
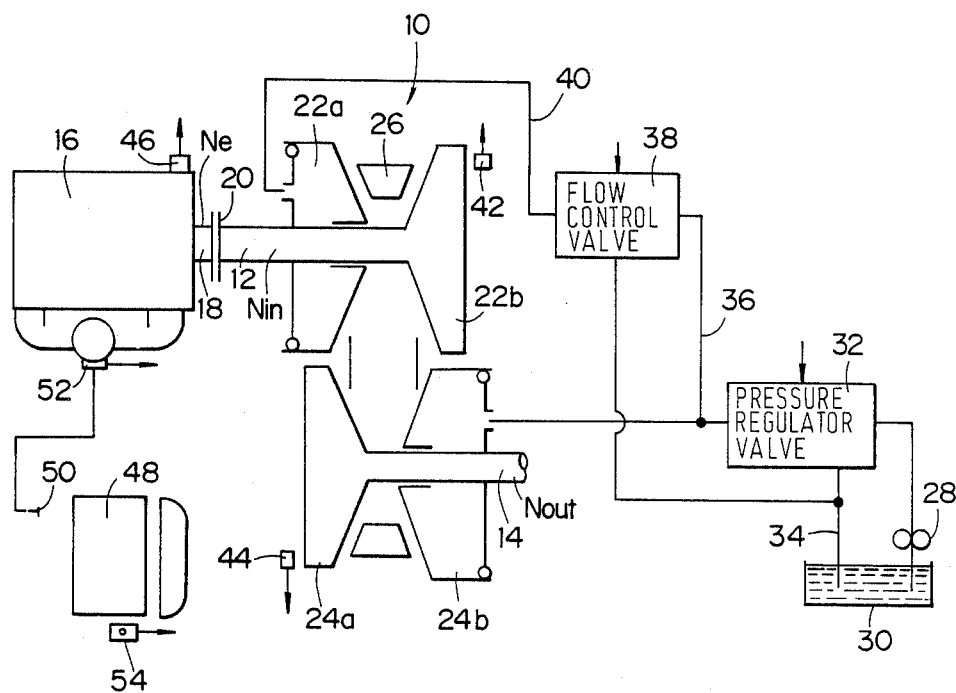
FIG. 1 is a schematic diagram of the general arrangement of the CVT.

Referring to FIG. 1, a CVT 10 has an input shaft 12 and an output shaft 14 being in parallel to each other. The input shaft 12 is provided coaxially with a crankshaft 18 of an engine 16, and connected to the crankshaft 18 through a clutch 20. Pulleys 22a and 22b on the input side are opposed to each other, and one 22a of the pulleys on the input side as being a movable pulley is provided on the input shaft 12 in a manner to be movable in the axial direction, and fixed in the rotating direction, while, the other 22b of the pulleys on the input side as being a stationary pulley is fixed to the input shaft 12. Similarly, pulleys 24a and 24b on the output side are opposed to each other, one 24a of the pulleys on the output side as being a stationary pulley is fixed to the output shaft 14, while, the other 24b of the pulleys on the output side as being a movable pulley is provided on the output shaft 14 in a manner to be movable in the axial direction and fixed in the rotating direction. Opposed faces of the pulleys 22a and 22b on the input side and those of the pulleys 24a and 24b on the output side are formed into tapered shapes, respectively, and a belt (V belt) 26 being an isosceles trapezoidal shape in cross section is racked across the pulleys 22a and 22b on the input side and the pulleys 24a and 24b on the output side. An oil pump 28 feeds oil to a pressure regulator valve 32 from an oil pool 30. The pressure regulator valve 32 comprises an electromagnetic relief valve and varies a spill volume of oil to a drain 34 to control a line pressure of an oil line 36, whereby the line pressure of an oil line 36 is delivered to a hydraulic cylinder of the pulley 24b on the output side and a flow control valve 38. The flow control valve 38 controls the feed flowrate of oil from the oil line 36 to an oil line 40 connected to a hydraulic cylinder of the pulley 22a on the inout side and the discharge flowrate of oil from the oil line 40 to the drain 34. Forces urging against the belt 26 of the pulleys 22a and 22b on the input side and of the pulleys 24a and 24b on the output side are controlled by the hydraulic pressures of the hydraulic cylinders on the input side and the output side, and the diameters of the belt 26 guided around the tapered surfaces of the pulleys 22a and 22b on the input side and of the pulleys 24a and 24b on the output side, which are varied in association with the aforesaid urging forces, with the result that the speed ratio e (=Nout/Nin, where Nout is a rotational speed of the output shaft 14, Nin is a rotational speed of the input shaft 12, and, in this embodiment, Nin =engine rotational speed Ne) of the CVT 10 is varied. The line pressure of the hydraulic cylinder on the output side is controlled to the least necessary value which can secure the power transmission, avoiding slips of the belt 26, in order to prevent the driving loss of the oil pump 28, and the speed ratio e is controlled by the hydraulic pressure of the hydraulic cylinder on the input side. Additionally, the hydraulic pressure of the hydraulic cylinder on the input side is lower than or equal to the hydraulic pressure of the hydraulic cylinder on the output side, however, the pressure receiving area of the hydraulic cylinder on the input side is larger than the pressure receiving area of the hydraulic cylinder on the output side, so that the urging force of the pulleys 22a and 22b on the input side can be made larger than the urging force of the pulleys 24a and 24b on the output side. A rotation angle sensor 42 on the input side and a rotation angle sensor 44 on the output side detect rotational speeds Nin and Nout of the input shaft 12 and the output shaft 14, respectively, and a water temperature sensor 46 detects cooling water temperature of the engine 16. An accelerator pedal 50 is provided at a driver's seat 48, a throttle valve in an intake air path is interlocked with the accelerator pedal 50, and a throttle opening sensor 52 detects a throttle opening $\theta$. A shift position sensor 54 detects a shift range of a shift lever located close to the driver's seat.

Figure 2:
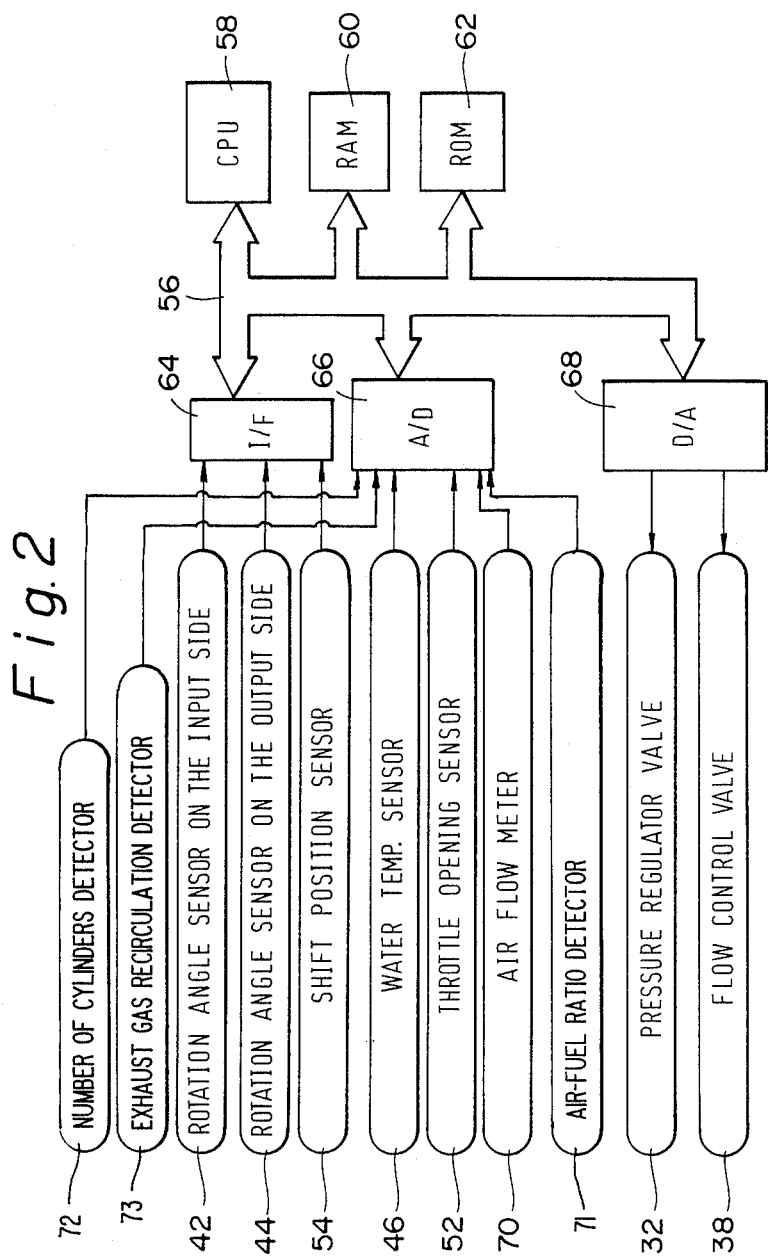
FIG. 2 is a block diagram showing the electronic control device.

FIG. 2 is a block diagram of the electronic control device. An address data bus 56 connects a CPU (Central Processing Unit) 58, an RAM (Random Access Memory) 60, an ROM (Read-Only Memory) 62, an I/F (Interface) 64, an A/D (Analogue/Digital Convertor) 66 and D/A (Digital/Analogue Convertor) 68 to one another. The I/F 64 receives pulse signals from the rotation angle sensor 42 on the input side, the rotation angle sensor 44 on the output side and the shift position sensor 54, the A/D 66 receives analogue signals from the water temperature sensor 46 and the throttle opening sensor 52, an airflow meter 70 for detecting an intake air flowrate, the air-fuel ratio detector 71, the number of cylinders detector 72 and the exhaust gas recirculation detector 73, and the D/A 68 outputs pulse signals to the pressure regulator valve 32 and the flow control valve 38.

Figure 3:
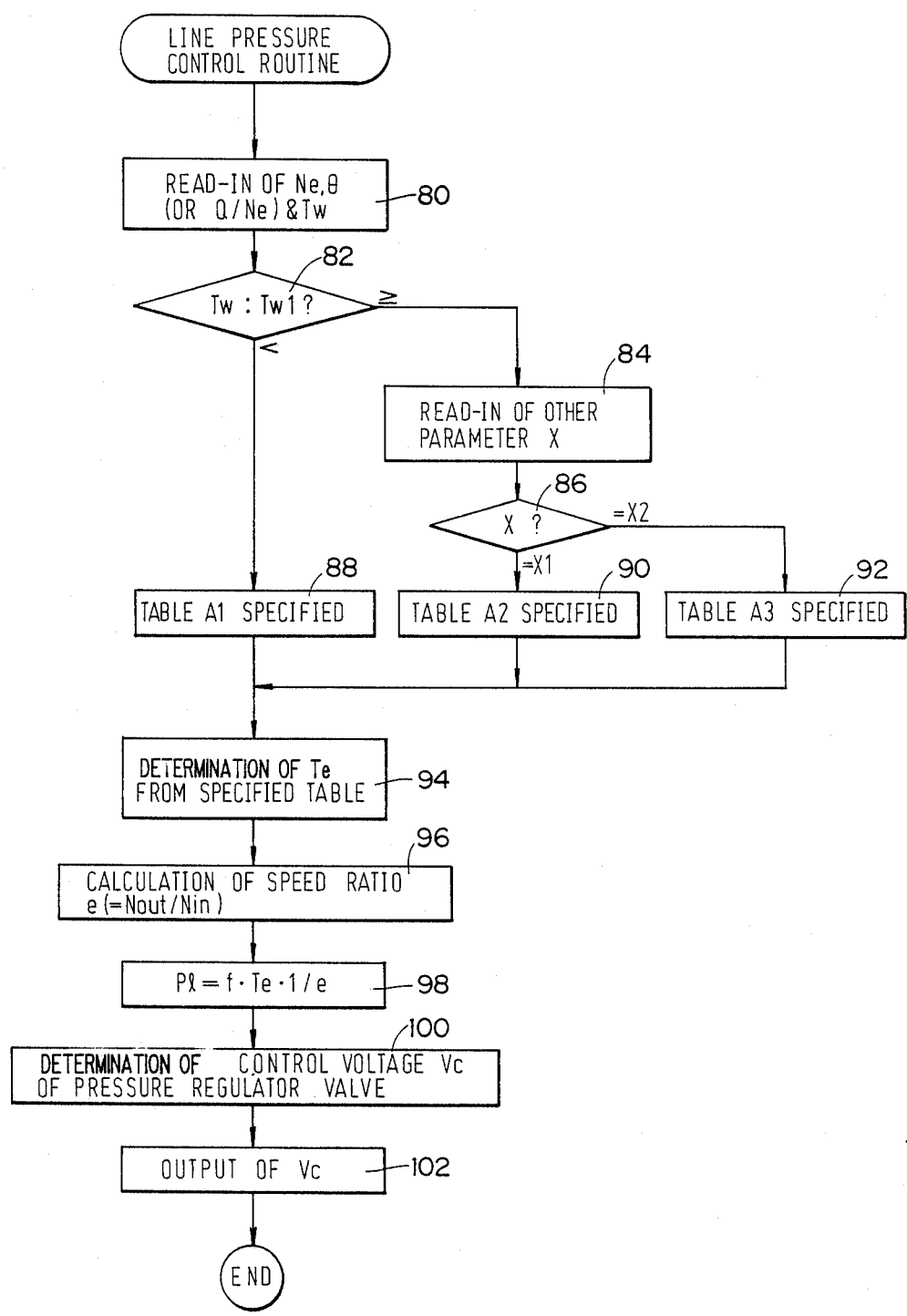
FIG. 3 is a flow chart of a line pressure control routine.
Figure 4:
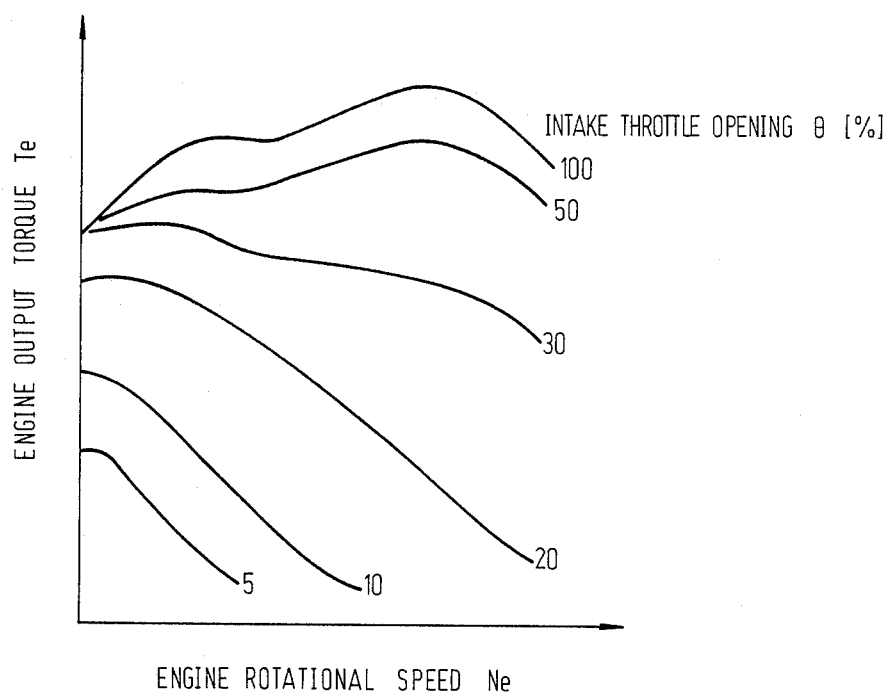
FIGS. 4 to 9 show the characteristics of the engine output torque in the various operating conditions of the engine.
Figure 5:
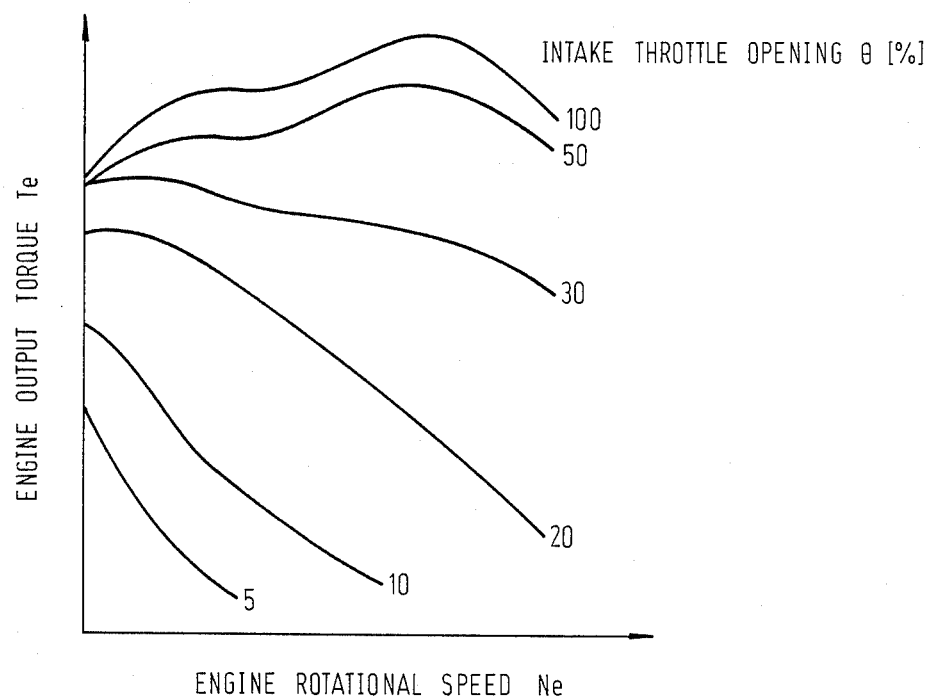
Figure 6:
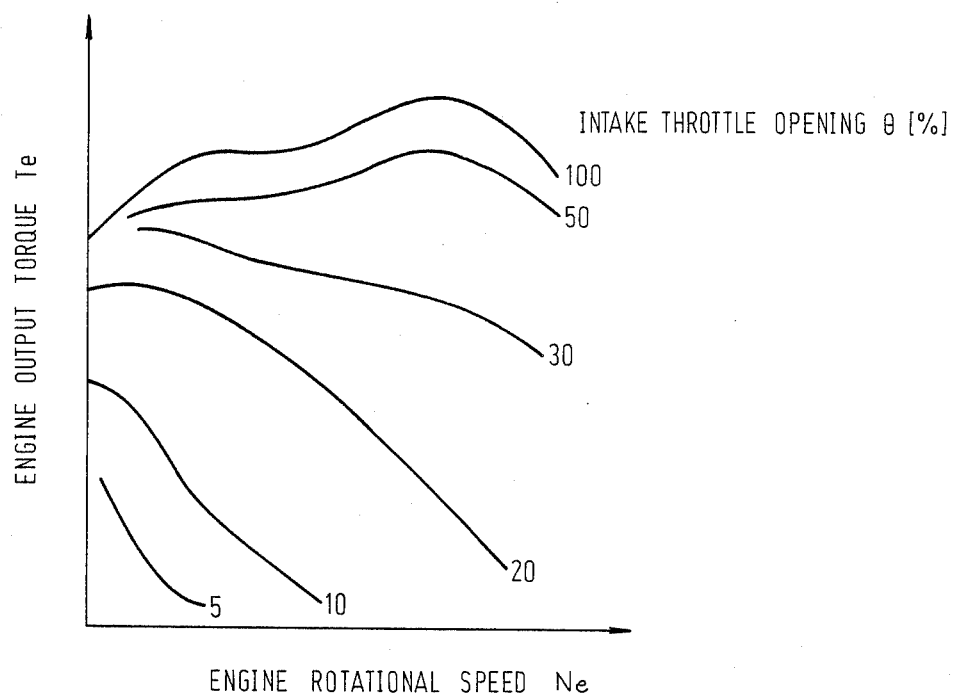
Figure 7:
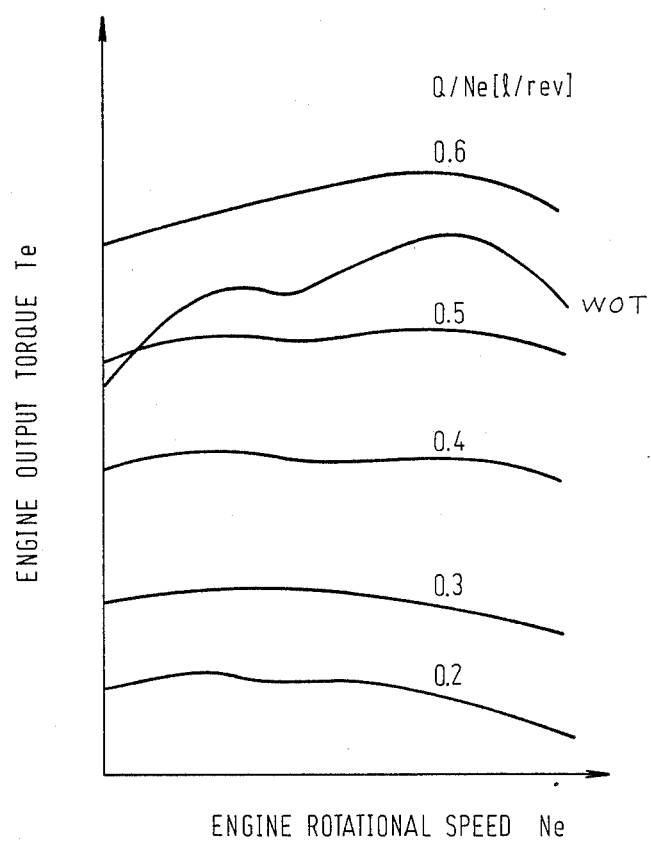
Figure 8:
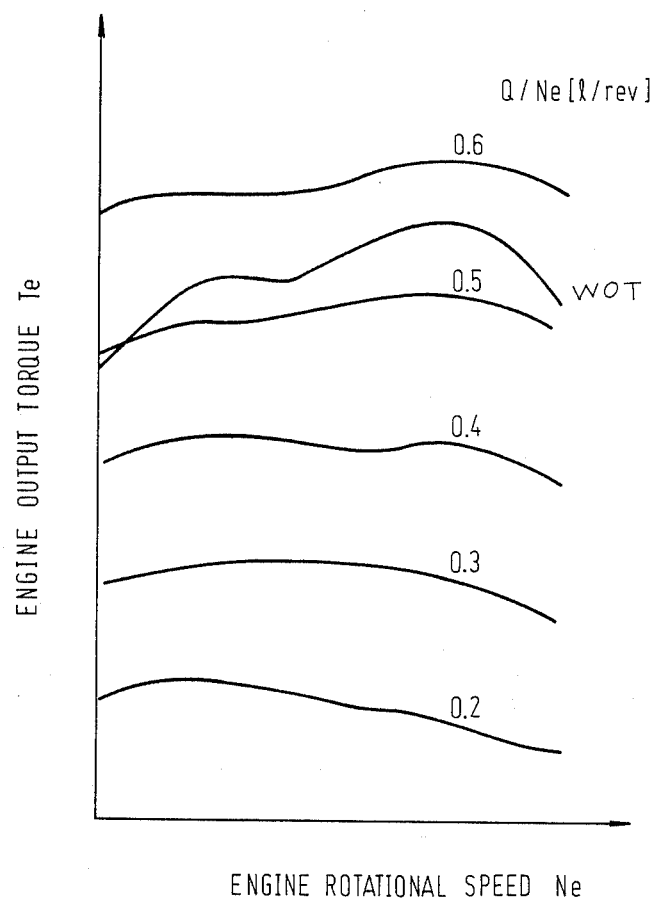
Figure 9:
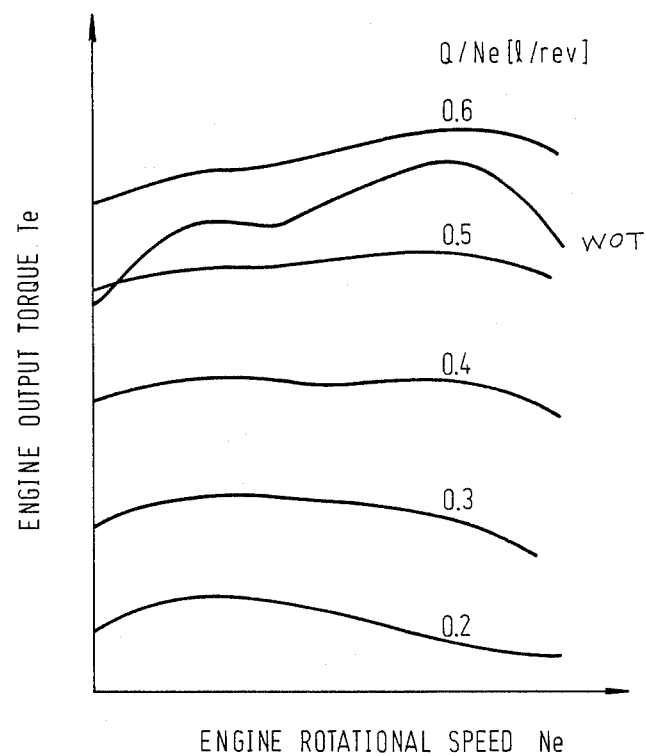
Figure 10:
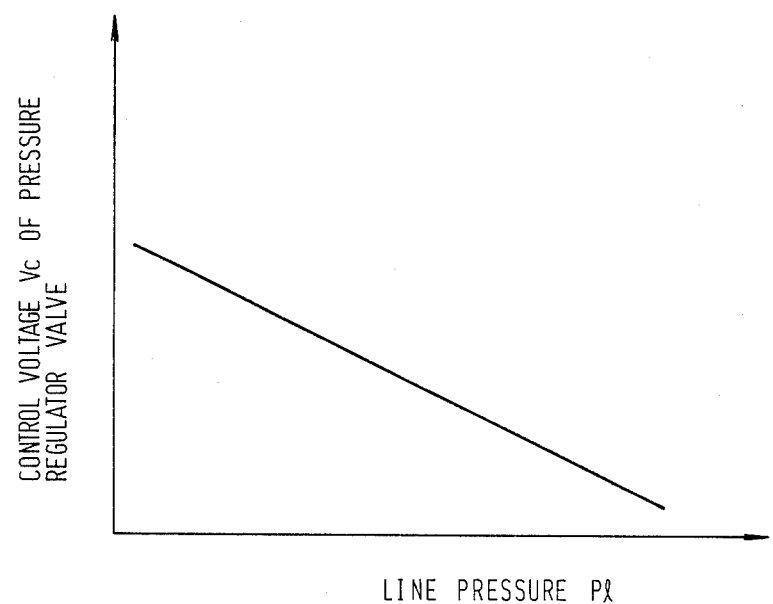
FIG. 10 is a graphic chart showing the relationship between the control voltage of the pressure regulator valve and the line pressure.

FIG. 3 is a flow chart of the line pressure control routine. Prior to description of FIG. 3, description will be given of FIGS. 4 to 10 relating to the routine shown in FIG. 3. FIGS. 4 to 6 show the relationship between an engine rotational speed Ne (=Nin) and an output torque Te of the engine, with an intake throttle opening $\theta$ being a parameter. FIG. 4 shows the relationship during warming-up of the engine, and the output torque Te is lowered due to the viscosity of an engine oil and the efficiency of combustion. FIG. 5 shows the relationship during operation by use of a gasified fuel-air mixture having a stoichiometric air-fuel ratio after warming-up, and FIG. 6 shows the relationship during operation by use of a lean gasified fuel-air mixture after warming-up. In order to secure the stability or high output of the engine in a low throttle opening region and a high throttle opening region, a gasified fuel-air mixture of the stoichiometric air-fuel ratio is fed to combustion chambers of the engine, while, in order to improve the fuel consumption rate in a medium throttle opening region, a lean gasified fuel-air mixture is supplied to the combustion chambers of the engine. Data of the engine output Te as defined in FIGS. 4 and 6 are stored in the ROM 62 as Tables (Maps) A1, A2 and A3. FIGS. 7 to 9 indicate an intake air flowrate per unit rotation of the engine as Q/Ne (where Q is an intake air flowrate and Ne an engine rotational speed), and show the relationship between the engine rotational speed Ne and the engine output torque Te, with Q/Ne being a parameter. Similarly to the case of FIGS. 4 to 6, FIG. 7 shows the relationship during warming-up, FIG. 8 the relationship during operation under the stoichiometric air-fuel ratio after the completion of warming-up and FIG. 9 the relationship during operation under the lean gasified fuel-air mixture after the completion of the warming-up, respectively. As Tables A1–A3, the relationship shown in FIGS. 7 to 9 may be used in place of the relationship shown in FIGS. 4 to 6. Additionally, WOT (Wide Open Throttle) means the maximum throttle opening. FIG. 10 shows the relationship between a line pressure Pl and a control voltage Vc of the pressure regulator valve 32. Pl and Vc are in a linear relationship.

Detailed description will now be given of the routine shown in FIG. 3.

In the first place, the engine rotational speed Ne, intake throttle opening $\theta$ and engine cooling water temperature Tw are read in (Step 80). Q/Ne as the intake air flowrate per rotation of the engine may be read in instead of the intake throttle opening $\theta$. Next, the cooling water temperature Tw is compared with a predetermined value Tw1, and judgment is made as to whether it is during warming-up or it is after the warming-up (Step 82). If it is after the warming-up (Tw higher than or equal to Tw1), then Ne, θ (or Q/Ne) and an operation parameter X other than Tw such for example as an air-fuel ratio of the gasified fuel-air mixture are read in (Step 84), whereby judgment is made if X is X1 such for example as the stoichiometric air-fuel ratio or X2 such for example as the lean air-fuel ratio (Step 86). As used as other operation parameters in place of the air-fuel ratio of the gasified fuel-air mixture, the facts that how many cylinders out of all the cylinders are fed with fuel, namely the whole cylinder operation or the partial cylinder operation, or that the exhaust gas recirculation is performed or not. During the period of time in which the partial cylinder operation or the exhaust gas recirculation are performed, even if Ne and θ (or Q/Ne) is not varied, the output torque Te is low.

Finally, during warming-up, Table A1 is specified (Step 88). After the completion of warming-up, if X=X1, then Table A2 is specified (Step 90). After the completion of warming-up, if X=X2, then Table A3 is specified (Step 92).

Subsequently, the output torque Te is read-out or determined on the basis of the specified Table (Step 94), the speed ratio e (=Nout/Nin) of the CVT 10 is calculated (Step 96), and the line pressure P1 is calculated from P1=f.Te.1/e (Step 98), where f is a coefficient and Te.1/e is commensurate to a torque at the pulleys on the output side 24a and 24b of the CVT 10. The control voltage Vc of the pressure regulator valve 32 is determined from the value P1 on the basis of the graphic chart shown in FIG. 10 (Step 100), and this Vc is outputted to the pressure regulator valve 32 (Step 102).

Figure 11:
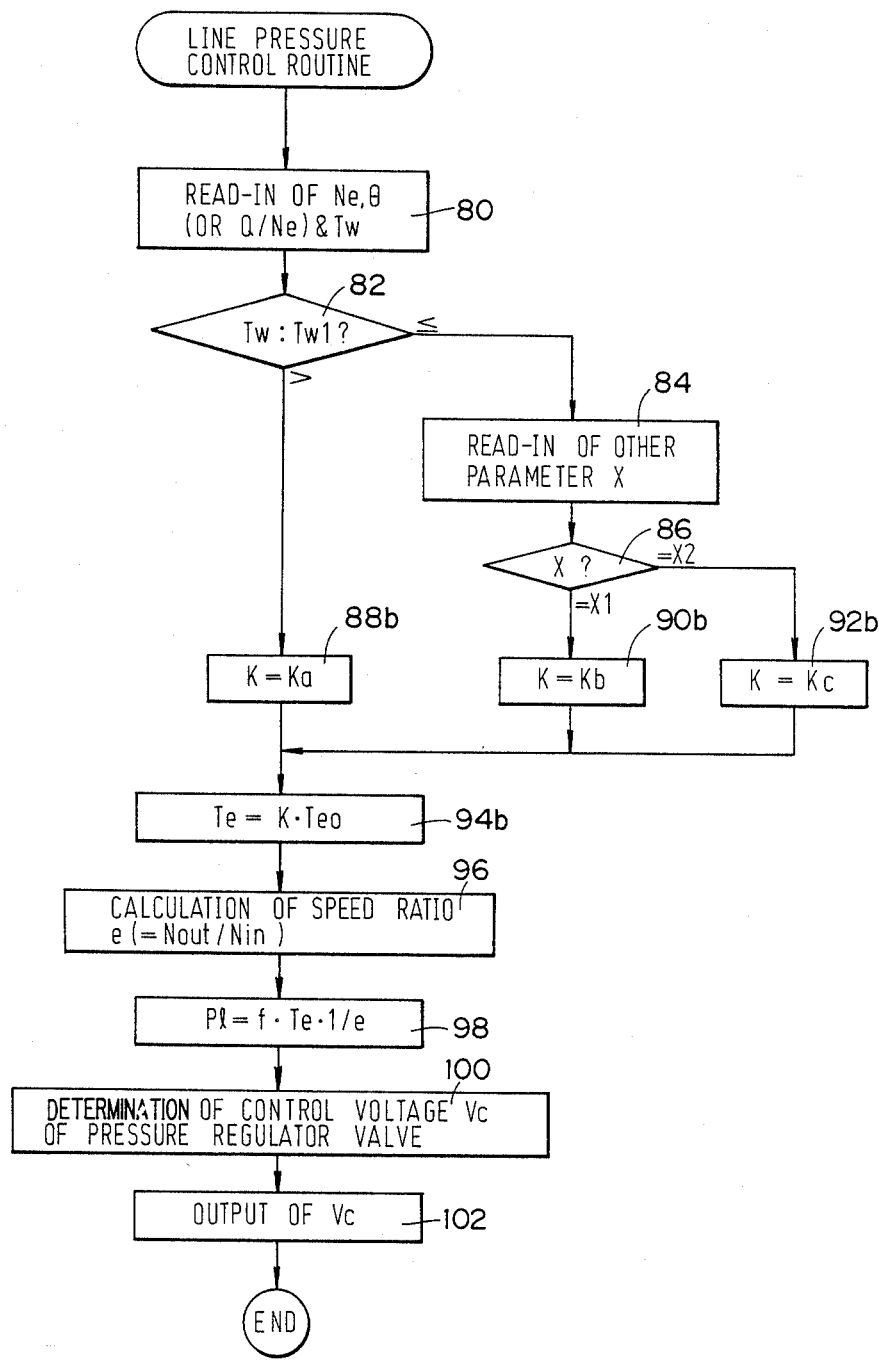
FIG. 11 is a flow chart of another line pressure control routine.

FIG. 11 shows another example of the line pressure control routine. Description will now be given of part which is different from the routine shown in FIG. 3. Ka, Kb and Kc are substituted into a coefficient K in Steps 88b, 90b and 92b, and a product K.Teo obtained by multiplying K and the basic torque Teo is made to be a calculated value of the output torque Te in Step 94b. The basic torque Teo is set as a function of Ne and θ (or Q/Ne), Ka, Kb and Kc are set as correction factors during warming-up, after the warming-up and during the period of time of X=X1, and after the warming-up and during the time period of X=X2, and Te as the calculated value is close to the actual output torque of the engine through various operating conditions of the engine.

The present invention has been described in conjunction with the examples shown in the drawings, however, it should be apparent to those skilled in the art to correct and modify the present invention in various ways within a range of not departing from the spirit of the present invention as described in claims.

What is claimed is:

1. A control device in a continuously variable transmission system for a vehicle, wherein a belt is racked across a pulley on the input side and a pulley on the output side, an engine power is transmitted through said belt, and an urging force of said belt by one of said pulleys is controlled by a line pressure of a hydraulic cylinder of said pulley, comprising processor means including:

(a) means for determining an output torque of an engine from an engine rotational speed, one of an intake throttle opening and an intake air flowrate per unit rotation of said engine, and at least one additional engine operation parameter, and (b) means for regulating the line pressure in relation to a value determined by said determining means.

2. control device as set forth in claim 1, wherein said at least one additional parameter includes at least one of engine temperature, an air-fuel ratio of a gasified fuel-air mixture, the number of cylinders out of all the cylinders of the engine to which fuel is fed, and the presence of exhaust gas recirculation.

3. A control device as set forth in claim 1, wherein said one of said pulleys is a pulley on the output side.

4. A control device as set forth in claim 1, including a map for each condition of each said additional parameter, wherein said determining means comprises means for determining an engine output torque on the basis of a selected one of said maps.

5. A control device as set forth in claim 1, wherein said determining means includes at least one reference map and means for calculating the engine output torque on the basis of a product obtained by multiplying coefficients determined in accordance with the conditions of said additional parameters and a basic output torque determined from said reference map.

6. A control device as set forth in claim 5, wherein said regulating means includes means for calculating a target line pressure on the basis of a product obtained by multiplying said engine output torque, an inverse number of the speed ratio of the continuously variable transmission system and said coefficients, and means for outputting a control signal to a pressure regulator valve on the basis of the value thus calculated.

7. The control device of claim 1, including means for detecting the engine rotational speed, means for detecting one of the intake throttle opening and the intake air flowrate and means for detecting the additional parameter, wherein said processor means includes means for reading the detected engine rotational speed, means for reading one of the detected intake throttle opening and the detected intake air flowrate and means for reading the detected additional parameter.

8. a control method in a continuously variable transmission system for a vehicle, wherein a belt is racked across a pulley on the input side and a pulley on the output side, an engine power is transmitted through said belt, and an urging force of said belt by one of said pulleys is controlled by a line pressure of a hydraulic cylinder of said pulley, comprising the steps of:

determining an output torque of an engine from an engine rotational speed, an intake throttle opening and at least one additional engine operation parameter; and regulating the line pressure in relation to a value thus determined.

9. A control method in a continuously variable transmission system for a vehicle, wherein a belt is racked across a pulley on the input side and a pulley on the output side, an engine power is transmitted through said belt, and an urging force of said belt by one of said pulleys is controlled by a line pressure of a hydraulic cylinder of said pulley, comprising the steps of:

determining an output torque of an engine from an engine rotational speed, an intake air flowrate per unit rotation of said engine and at least one additional engine operation parameter; and regulating the line pressure in relation to a value thus determined.

* * * * *